(12) United States Patent
Loaiza et al.

(10) Patent No.: US 10,380,021 B2
(45) Date of Patent: Aug. 13, 2019

(54) RAPID RECOVERY FROM DOWNTIME OF MIRRORED STORAGE DEVICE

(71) Applicant: Oracle International Corporation, Redwood Shores, CA (US)

(72) Inventors: Juan R. Loaiza, Woodside, CA (US); Kothanda Umamageswaran, Sunnyvale, CA (US); David Friedman, New York, NY (US); Jia Shi, Burlingame, CA (US); Zuoyu Tao, Belmont, CA (US); Alex Tsukerman, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 888 days.

(21) Appl. No.: 13/801,319

(22) Filed: Mar. 13, 2013

(65) Prior Publication Data
US 2014/0281272 A1 Sep. 18, 2014

(51) Int. Cl.
*G06F 12/0868* (2016.01)
*G06F 12/0804* (2016.01)
(Continued)

(52) U.S. Cl.
CPC ...... *G06F 12/0868* (2013.01); *G06F 11/2058* (2013.01); *G06F 11/2082* (2013.01);
(Continued)

(58) Field of Classification Search
CPC ...... G06F 3/0619; G06F 3/065; G06F 3/0689; G06F 12/0868; G06F 11/2056; G06F 11/2082
See application file for complete search history.

(56) References Cited

U.S. PATENT DOCUMENTS

| 4,425,615 A | 1/1984 | Swenson et al. |
| 5,717,893 A | 2/1998 | Mattson |

(Continued)

FOREIGN PATENT DOCUMENTS

| GB | 2409 301 A | 6/2005 |
| WO | WO 93/18461 | 9/1993 |

OTHER PUBLICATIONS

Microsoft, "Database Instant File Initialization", SQL Server 2016, https://msdn.microsoft.com/en-us/library/ms175935.aspx, 3 pages.

*Primary Examiner* — Edward J Dudek, Jr.
(74) *Attorney, Agent, or Firm* — Hickman Palermo Becker Bingham LLP

(57) ABSTRACT

No-loss rapid recovery performs resynchronization efficiently while concurrently allowing availability to mirrored data on the storage device. No-loss rapid recovery has two stages and involves storage devices that have both a non-volatile cache and primary storage and that operate as mirror buddies. The first stage is referred to herein as the buddy-retention stage. During the buddy-retention stage, writes to mirrored data are not performed on the offline mirror buddy but are performed on the online mirror buddy. The mirrored data changed in the online mirrored buddy is retained in the non-volatile cache of the retention buddy. The next stage is referred to herein as the rapid resynchronization stage. In this stage, the changed mirrored data retained by the retention buddy for no-loss rapid recovery is used to resynchronize the offline buddy. The storage device is resynchronized using the changed mirrored data retained in the cache of the mirror buddy.

14 Claims, 3 Drawing Sheets

(51) Int. Cl.
  *G06F 11/20* (2006.01)
  *G06F 12/12* (2016.01)
(52) U.S. Cl.
  CPC .......... *G06F 12/0804* (2013.01); *G06F 12/12* (2013.01); *G06F 2212/222* (2013.01); *G06F 2212/262* (2013.01); *G06F 2212/286* (2013.01)

(56) References Cited

U.S. PATENT DOCUMENTS

| | | |
|---|---|---|
| 5,774,643 A | 6/1998 | Lubbers |
| 5,943,689 A | 8/1999 | Tamer |
| 6,457,105 B1 | 9/2002 | Spencer et al. |
| 6,728,823 B1 | 4/2004 | Walker et al. |
| 6,922,754 B2 | 7/2005 | Liu et al. |
| 7,069,324 B1 | 6/2006 | Tiwana et al. |
| 7,159,076 B2 | 1/2007 | Madter |
| 7,165,144 B2 | 1/2007 | Choubal et al. |
| 7,290,090 B2 | 10/2007 | Madter |
| 7,461,147 B1 | 12/2008 | Mowat et al. |
| 7,506,103 B2 | 3/2009 | Madter |
| 7,636,814 B1 | 12/2009 | Karr et al. |
| 7,660,945 B1 | 2/2010 | Lee |
| 7,836,262 B2 | 11/2010 | Gunna et al. |
| 7,904,562 B2 | 3/2011 | Takase et al. |
| 8,244,984 B1 | 8/2012 | Glasco et al. |
| 8,327,080 B1 | 12/2012 | Der |
| 8,359,429 B1 | 1/2013 | Sharma et al. |
| 8,370,452 B2 | 2/2013 | Harvell et al. |
| 8,683,139 B2 | 3/2014 | Gaither |
| 9,256,542 B1 | 2/2016 | Flower |
| 9,703,706 B2 | 7/2017 | Bagal et al. |
| 2002/0059287 A1 | 5/2002 | Karasudani |
| 2003/0115324 A1 | 6/2003 | Blumenau |
| 2004/0054860 A1 | 3/2004 | Dixit |
| 2004/0117441 A1 | 6/2004 | Liu et al. |
| 2004/0148486 A1 | 7/2004 | Burton |
| 2004/0225845 A1 | 11/2004 | Kruckemyer et al. |
| 2004/0230753 A1 | 11/2004 | Amiri |
| 2004/0254943 A1 | 12/2004 | Malcolm |
| 2005/0160224 A1 | 7/2005 | Cuomo et al. |
| 2005/0193160 A1 | 9/2005 | Bhatte et al. |
| 2005/0210202 A1 | 9/2005 | Choubal et al. |
| 2006/0106890 A1 | 5/2006 | Paul et al. |
| 2006/0271605 A1* | 11/2006 | Petruzzo ...................... 707/201 |
| 2006/0271740 A1 | 11/2006 | Mark |
| 2007/0067575 A1 | 3/2007 | Morris et al. |
| 2007/0078914 A1 | 4/2007 | Correl |
| 2007/0260819 A1 | 11/2007 | Gao et al. |
| 2008/0016283 A1 | 1/2008 | Madter |
| 2008/0046736 A1 | 2/2008 | Arimilli et al. |
| 2008/0104329 A1 | 5/2008 | Gaither |
| 2008/0235479 A1 | 9/2008 | Scales |
| 2009/0164536 A1 | 6/2009 | Nasre et al. |
| 2009/0182960 A1* | 7/2009 | Crockett ............ G06F 11/2074 711/162 |
| 2009/0193189 A1 | 7/2009 | Carswell et al. |
| 2009/0248871 A1 | 10/2009 | Takase et al. |
| 2009/0254521 A1 | 10/2009 | Raman |
| 2010/0017556 A1 | 1/2010 | Chin et al. |
| 2010/0070448 A1 | 3/2010 | Omoigui |
| 2010/0122026 A1 | 5/2010 | Umamageswaran et al. |
| 2010/0199042 A1* | 8/2010 | Bates .................... H04L 67/289 711/114 |
| 2010/0205367 A1* | 8/2010 | Ehrlich ............... G06F 12/0804 711/113 |
| 2011/0022801 A1 | 1/2011 | Flynn |
| 2011/0040861 A1 | 2/2011 | Van der Merwe |
| 2011/0153719 A1 | 6/2011 | Santoro |
| 2011/0173325 A1 | 7/2011 | Cherian et al. |
| 2011/0191522 A1 | 8/2011 | Condict |
| 2011/0191543 A1 | 8/2011 | Craske et al. |
| 2012/0166729 A1 | 6/2012 | Donley |
| 2012/0290786 A1 | 11/2012 | Mesnier |
| 2013/0086330 A1 | 4/2013 | Baddepudi et al. |
| 2013/0290598 A1 | 10/2013 | Fiske |
| 2013/0326152 A1 | 12/2013 | Loaiza et al. |
| 2015/0006813 A1 | 1/2015 | Goyal et al. |
| 2015/0019834 A1 | 1/2015 | Loh |
| 2015/0088822 A1 | 3/2015 | Raja |
| 2015/0089138 A1 | 3/2015 | Tao et al. |
| 2016/0026579 A1 | 1/2016 | Samanta |
| 2016/0188414 A1 | 6/2016 | Jayakumar |
| 2017/0177488 A1 | 6/2017 | Leung |

\* cited by examiner

RAPID RECOVERY FROM DOWNTIME OF MIRRORED STORAGE DEVICE

CROSS-REFERENCE TO RELATED APPLICATIONS

BENEFIT CLAIM

This application is related to U.S. application Ser. No. 13/485,557, entitled Rapid Recovery From Loss Of Storage Device Cache, filed on May 31, 2012 by Juan R. Loaiza, et al., the contents of which are incorporated herein by reference.

This application is related to U.S. application Ser. No. 13/288,785, entitled Write-Back Storage Cache Based On Fast Persistent Memory, filed on Nov. 3, 2011 by Bharat Chandra Baddepudi, et al., the contents of which are incorporated herein by reference.

This application is related to application Ser. No. 12/631,985, Caching Data Between A Database Server And a Storage System, filed by Kiran Badrinarain Goyal, et al., on Dec. 7, 2009, the contents of which are incorporated by reference.

This application is related to Application No. 12/691,146, Selectively Reading Data From Cache And Primary Storage Based on Whether Cache is Overloaded, filed by Kothanda Umamageswaran, et al., on Jan. 21, 2010, the contents of which are incorporated by reference.

FIELD OF THE INVENTION

The present invention relates to data storage devices.

BACKGROUND

In storage management, data is stored in storage devices. Storage devices may use two (or more) different types of storage to store and provide access to data, which are primary storage and cache. Primary storage is where data is primarily and persistently stored, and cache is where data is stored to provide quick access to data. The cache stores less data than primary storage and is often comprised of more expensive and more quickly accessed memory than that used for primary storage. For example, cache may be volatile memory or non-volatile flash memory and the primary storage may be disk-based storage.

To ensure availability of data on a storage device when that storage device fails or otherwise becomes unavailable, storage management systems use data mirroring. In data mirroring, data is stored redundantly in a set of storage devices referred to as a mirrored set or a mirrored set of storage devices. Data stored on a storage device in a mirrored set is stored redundantly on one or more other storage devices in the mirrored set. Storage devices in a mirrored set are referred to as mirror buddies with respect to each other. Data mirroring ensures that when mirrored data on a storage device becomes unavailable on that storage device, a redundantly stored copy may be obtained from at least one mirror buddy.

A storage device may be brought down to perform maintenance, such as upgrading. If the storage device is mirrored, availability to mirrored data may be maintained by using "staggered down time." In staggered down time, a mirrored set of storage devices are brought down one at a time, while another in the set remains online to provide access to mirrored data on the down storage device. When a storage device is down, mirrored data on the other online storage device may be changed, rendering mirrored data on the down storage device out-of-date. To bring the down storage device back online, the mirrored data on the storage device is made current with the mirrored data stored on the other storage device that remained online. Discussed herein are techniques and approaches for making mirrored data current on a storage device that was down during a staggered downtime.

DETAILED DESCRIPTION

Figure 1:
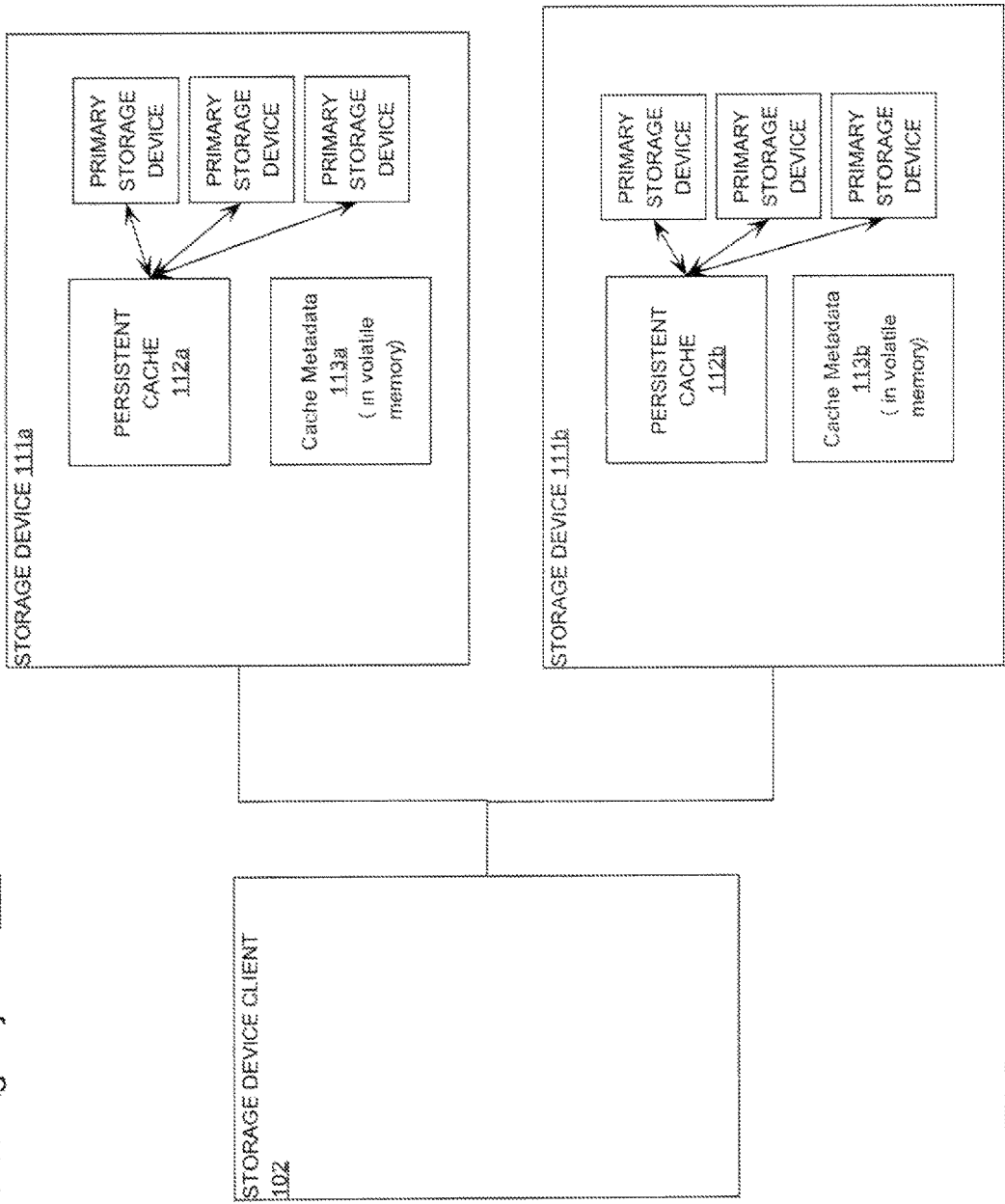
FIG. 1 is a drawing depicting a mirrored storage system according to an embodiment of the present invention.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As the term is used herein, the term resynchronize is an operation that brings up-to-date or otherwise in-synch mirrored data stored on a storage device that has become out-of-date or out-of-synch, by writing to the storage device at least a portion of mirrored data stored on another storage device. During staggered downtime, a down mirrored storage device that is to be brought back online is resynchronized using mirrored data stored on another storage device. It is advantageous to perform such resynchronization in a way that is efficient and that hastens the availability of data stored on the storage device coming back online. Described herein are mechanisms for performing resynchronization efficiently while concurrently allowing availability to mirrored data on the storage device. These approaches are referred to herein as "no-loss rapid recovery".

According to an embodiment, no-loss rapid recovering has two stages and involves storage devices that have both a non-volatile cache and primary storage and that operate as mirror buddies. The first stage is referred to herein as the buddy-retention stage. During the buddy-retention stage, writes to mirrored data are not performed on the offline mirror buddy but are performed on the online mirror buddy, referred to herein as the retention buddy. Importantly, the mirrored data changed in the retention buddy is stored and retained in the non-volatile cache of the retention buddy. The mirrored data changed may also be written to primary storage of the retention buddy, and is retained in the non-volatile cache even after being written to the primary storage of the retention buddy.

The offline buddy is referred to as being "offline" because it is not performing writes and/or being requested to perform writes by its storage device client. The offline buddy may be running to perform, for example, maintenance tasks such as upgrades during staggered downtime, and may be performing writes on another set of mirrored data mirrored with another mirrored buddy.

The next stage is referred to herein as the rapid resynchronization stage. During rapid resynchronization, the changed mirrored data retained by the retention buddy for no-loss rapid recovery is used to resynchronize the offline buddy. The storage device is resynchronized using the changed mirrored data retained in the cache of the mirror buddy.

No-loss rapid recovery is referred to as "no-loss" and "rapid" for at least several reasons. No-loss rapid recovery is referred to as "no loss" because mirrored data changed while the offline buddy is down is redundantly stored in both the non-volatile cache and primary storage of the retention buddy, thereby minimizing risk of data loss in the event primary storage or non-volatile cache of the retention buddy fails. No-loss rapid recovery is referred to as "rapid" because the mirrored data needed for resynchronization can be retrieved more quickly from the retention buddy's non-volatile cache than from primary storage. In addition, the changes to mirrored data that are needed for resynchronization are tracked during buddy-retention. Resynchronization is performed more rapidly because only the tracked changes to mirrored data are needed for resynchronization.

Non-volatile cache of a storage device is generally much smaller than that of primary storage. The smaller size of a non-volatile cache limits the amount of changed mirrored data that can be retained for no-loss rapid recovery and the duration a storage device can be offline during no-loss rapid recovery. Applications of no-loss rapid recovery are best suited but are not limited to offline times that are planned for a relatively short duration.

Illustrative Mirrored Storage System

Referring to FIG. 1, it depicts mirrored storage system 101. Mirrored storage system 101 comprises a mirrored set of storage devices that include storage devices 111a and 111b (collectively storage devices 111) as mirror buddies, and a client of the storage devices 111a and 111b, storage device client 102. An example of a storage device client is a database server, including a multi-node database server with each node running an instance of a database server and having shared access to storage device 111a and 111b. It should be noted that an embodiment of the present invention is not limited to database servers as storage device clients, or to any number storage device clients.

Data stored by storage device client 102 on storage devices 111a is mirrored on storage device 111b. Only two storage devices are depicted as mirror buddies within mirrored storage system 101 for purposes of exposition, however, an embodiment of the present invention is not so limited.

Storage device 111a comprises primary storage (not labeled) and persistent cache 112a, which is a cache for the primary storage. Persistent cache 112a may comprise one or more non-volatile memory devices, which are a faster form of storage than the primary storage devices used for primary storage.

In an embodiment, a non-volatile memory device is a flash memory device and the respective primary storage device is a disk-based device. However, this is merely one example of the types of memory devices that may be used to implement a storage device in an embodiment. A persistent cache device may be a smaller higher-speed magnetic disk drive connected to a larger lower-speed magnetic disk device as primary storage device.

According to an embodiment, storage device 111a is a computer system complete with one or more CPUs and volatile memory. The CPU, pursuant execution of software, manages operation of storage device 111a.

Storage device 111a is a block mode device. A block mode device provides a client access to data in units referred to as a data block. A data block is the atomic unit of data from primary storage that a storage device client may request from a storage device.

Data in a primary storage device in storage device 111a is organized by data blocks. A data block is associated with a data block address which uniquely identifies the data block and the data block's storage location within a storage device. A data block's "primary block address" is an address that identifies a storage location of the data block within primary storage in storage device 111a. A storage device client may request a data block by primary block address, or even by primary block address ranges of data blocks.

Copies of data blocks from primary storage are stored in a persistent cache 112a. A copy of a data block in primary storage that is stored as a data block in persistent cache 112a is referred to herein as a cache copy or a cached data block.

When storage device client 102 requests a data block from storage device 111a, it is possible that storage device 111a cannot return the data block for a variety of reasons, including a malfunction on storage device 111a. In this case, storage device 111a may issue an error message in response to the request for a data block from the storage device client 102. Upon receipt of the error message, storage device client 102a sends a request to the mirror buddy of the storage device 111a, storage device 111b. Issuing another request for a data block to a mirror buddy of a storage device in response to detecting that the data block cannot be returned from the storage device is referred to herein as mirror redirection.

According to an embodiment, storage device 111b is structured and configured similarly to storage device 111a. Thus, storage device 111b comprises persistent cache 112b, cache metadata 113b, and primary storage, which are used similarly as described for storage device 111a. In another embodiment, storage device 111b may be structured differently. For example, storage device 111b may not include a persistent cache. An embodiment of the present invention is not limited to storage systems comprised of homogenously structured and/or configured storage devices.

Write-Modes

When a storage device client requests a block mode storage device to write a data block, the client receives a write acknowledgement acknowledging that the data block has been has been written persistently. Thus, when the data block is next requested by a client, the data block returned should have the version for which a write acknowledgement was most recently sent. The storage device can respond with a write acknowledgement in one of several modes.

In write-back mode, a storage device responds to a write request from a storage device client to write data by persistently writing the data to a non-volatile cache and then responding with a write acknowledgment to the requestor. The write acknowledgement is sent without necessarily having written the data that was requested to be written to primary storage. Instead, the data may be written to primary storage later.

In "write-through" mode, a storage device responds to a write request to write data blocks from a storage device client by writing the data blocks to primary storage before responding with a write acknowledgement to the requestor. The write acknowledgement is sent without necessarily having written the data that was requested to be written to non-volatile cache.

Cache Metadata

It is important to track that a cache copy is dirty and to accurately track what data block a cache copy is a copy of. For this function, storage device 111a stores and manages cache metadata 113a. Cache metadata 113a maps cache copies to data blocks in primary storage and identifies which cache copies are dirty. A cache copy that has not been modified after being copied from primary storage remains the same as the primary storage version and is thus referred to as being clean. For any particular cache copy, cache metadata 113a includes a dirty flag that indicates whether or not a cache copy is clean or dirty. Cache metadata 113b serves a similar function on storage device 111b.

Cache metadata 113a is stored in volatile memory of storage device 111a. According to an embodiment, a persistent copy of cache metadata 113a is stored in persistent cache 112a, as described in Write-Back Storage Cache Based On Fast Persistent Memory. Cache metadata 113a and the persistent copy are kept in synch. In the event of a hardware-induced or software-induced crash, cache metadata 113a can be reconstructed by reading from persistent cache 112a.

Illustrative No-Loss Rapid Recovery

Figure 2:
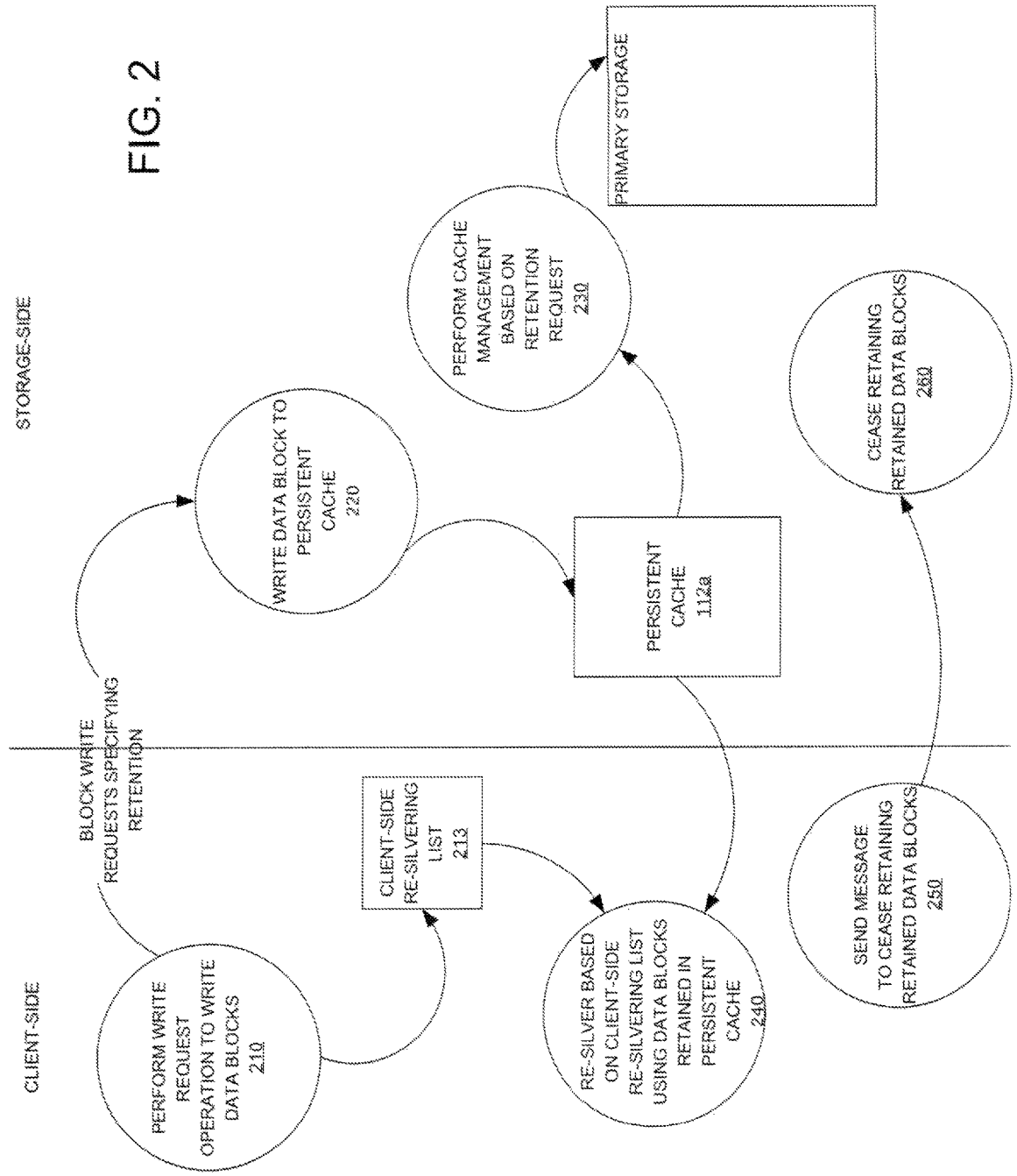
FIG. 2 is a drawing depicting operations performed for rapid recovery of a storage device according to an embodiment of the present invention.

FIG. 2 shows operations performed for no-loss rapid recovery according to an embodiment of the present invention. The operations are illustrated using mirrored storage system 101. In the illustration, a storage device 111a is the offline buddy and storage device 111b is the retention buddy, during for example, a staggered downtime. Operations 210, 220 and 230 are performed for the buddy-retention stage. Operations 240, 250, and 260 are performed for the rapid resynchronization stage. The retention buddy may be operating in either write-back or write-through mode.

Referring to FIG. 2, at 210, storage device client 102 performs a write request operation to write data blocks to storage device 111b. The operation entails transmitting data block write requests to storage device 111b that specify to retain the data blocks in persistent cache. The operation also entails updating client-side resynchronization list 213 to identify the data blocks as stale. Client-side resynchronization list 213 is used during rapid resynchronization.

At 220, in response to receiving the data block write requests from storage device client 102, storage device 111b writes the data blocks to persistent cache 112b and tracks the data blocks as data blocks to retain in persistent cache 112b. A data block that is tracked in this way as a data block to retain in persistent cache 112b is referred to herein as being in "recovery retention" or as being marked for recovery retention.

At 230, storage device 111b performs cache replacement. Cache replacement refers to an operation involving a selection of a data block in a cache for replacement within the cache with another data block. If dirty, the selected data block should be written to primary storage before replacement in the cache. Cache management is performed, for example, when a cache is full and memory in the cache is needed to store a data block. For storage device 111b, a data block is written to the cache when storage device 111b receives a request to write a data block to storage device 111b or when storage device 111b receives a request to read a data block. There are various approaches for cache replacement that use various "replacement selection factors" for selecting a data block for cache replacement. Replacement selection factors include, for example, recentness and/or frequency of access. In an embodiment of the present invention, a data block being in recovery retention is a dispositive replacement selection factor. While a data block is marked for recovery retention, it is not selected for replacement during cache replacement.

Next the rapid resynchronization phase begins. At 240, storage device client 102 resynchronizes storage device 111a using client-side resynchronization list 213. For each data block marked by (i.e. listed by) client-side resynchronization list 213, storage device client 102 transmits a read request for the data block to storage device 111b. When storage device client 102 receives the requested data block from storage device 111b, storage device client 102 writes the data block to storage device 111a and removes the data block from client-side resynchronization list 213.

Once resynchronization of data blocks in recovery retention is complete, at 250, storage device client 102 sends a message to storage device 111b indicating to cease retaining the data blocks marked for recovery retention.

At 260, storage device 111b ceases to retain the data blocks. At this point, the data blocks may be discarded from non-volatile cache of the retention buddy.

Alternatively, during cache replacement, the fact that the data blocks have been in recovery retention is ignored as a replacement selection factor. Once data blocks have been resynchronized, the retention of those data blocks may cease even before completion of the entire no-loss rapid recovery procedure.

In either write-back or write through mode, data blocks subject to recovery retention are in effect stored redundantly in the non-volatile cache and primary storage of the retention buddy. The data blocks subject to recovery retention are not selected for cache replacement even though the data blocks may be clean and there may be other data blocks in the non-volatile cache that are dirty. In the event primary storage fails in the retention buddy, rapid resynchronization can nevertheless be successfully completed because the data blocks subject to recovery retention are redundantly stored in the non-volatile cache of the retention buddy, from where the data blocks may be retrieved to complete resynchronization. In write-back mode, the data blocks subject to recovery retention in the non-volatile cache of the retention buddy may be clean or dirty. However, as long the clean or dirty data block is retained in the non-volatile cache of the retention buddy, rapid resynchronization can be completed even when the primary storage of the retention buddy fails.

Alternative Implementations

In the foregoing specification, embodiments of the invention have been described with reference to numerous specific details that may vary from implementation to implementation.

For example, embodiments have been illustrated using a mirrored storage system with two storage devices, where one is the mirror buddy of another. However, in an embodiment of the present invention, a mirrored storage system may have more than two storage devices and a storage device may have more than one mirror buddy. For example, a storage device may have multiple mirror buddies. A first portion of primary storage (e.g. a disk device or region of the disk) may be mirrored on a first mirror buddy while a second portion of the primary storage may be mirrored on a second mirror buddy. During no-loss rapid recovery, the offline buddy may have multiple retention buddies, e.g. a retention buddy for the first portion and a retention buddy for the second portion.

The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
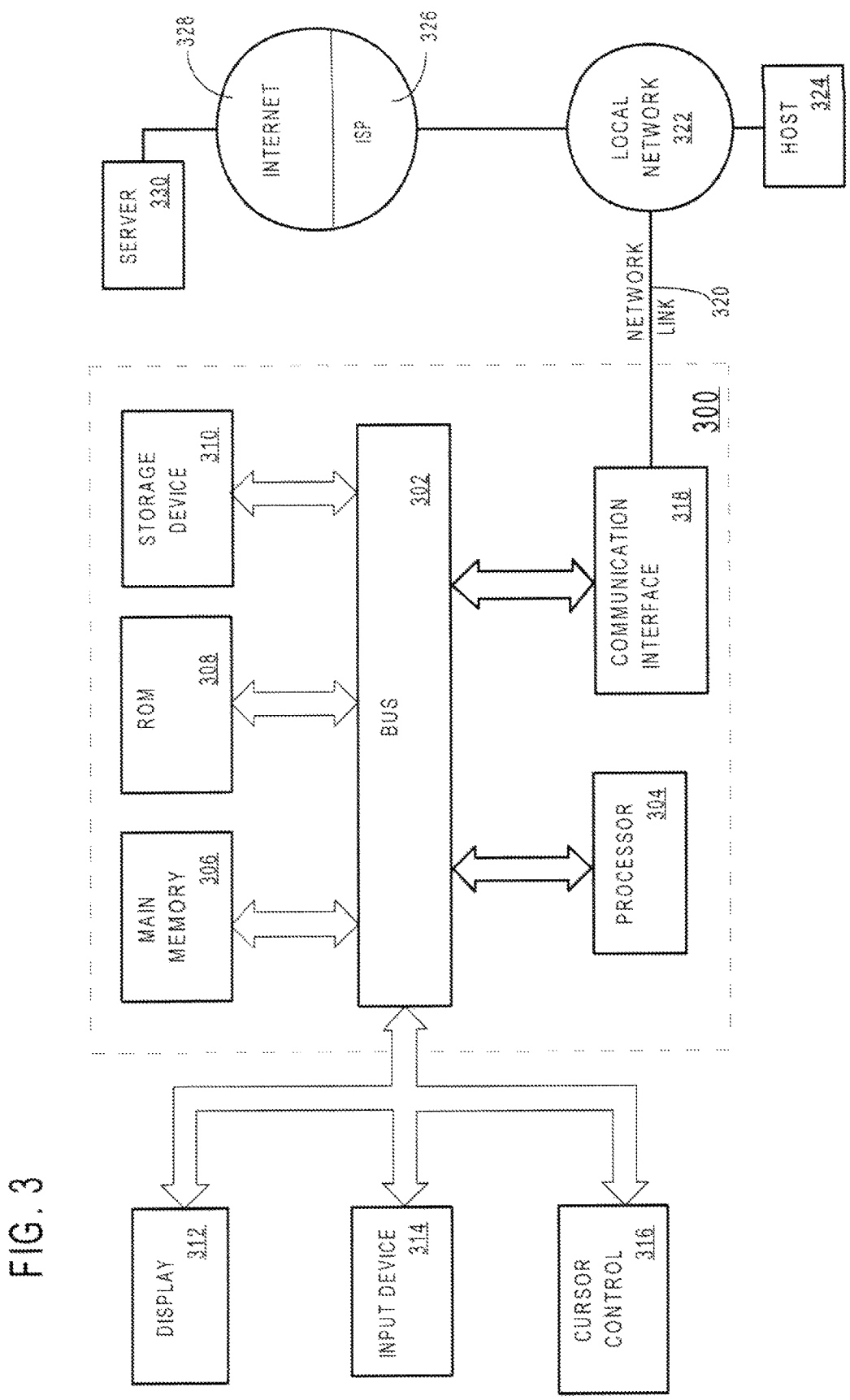
FIG. 3 is a computer system that may be used to implement an embodiment of the present invention.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP)

326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising steps of:
   from a storage device client of a mirrored set of storage devices for mirroring data that includes a plurality of data blocks, a first storage device receiving one or more requests indicating to retain data blocks in a non-volatile cache of said first storage device;
   wherein said first storage device and a second storage device belong to said mirrored set of storage devices;
   in response to receiving one or more requests to write said plurality of data blocks stored in a primary store of said first storage device:
      said first storage device writing said plurality of data blocks to said non-volatile cache of said first storage device;
      in response to receiving said one or more requests indicating to retain data blocks, marking each data block of said plurality of data blocks for recovery retention;
   performing cache management on said non-volatile cache, wherein performing cache management includes, while each data block of said plurality of data blocks is clean, foregoing replacing said each data block in response to said each data block being marked for recovery retention; and
   after foregoing replacing said each data block of said plurality of data blocks, resynchronizing said second storage device using said plurality of data blocks retained in said non-volatile cache of said first storage device.

2. The method of claim 1, wherein the steps further include:
   said storage device client of said mirrored set of storage devices transmitting said one or more requests to write said plurality of data blocks; and
   said storage device client of said mirrored set of storage devices tracking in a list of dirty data blocks said plurality of data blocks.

3. The method of claim 2, wherein the step of resynchronizing includes:
   based on the list of dirty data blocks, said storage device client identifying data blocks to resynchronize in said second storage device, wherein identifying data blocks to resynchronize includes identifying said plurality of data blocks;
   said storage device client of said mirrored set of storage devices transmitting a request for said plurality of data blocks to said first storage device;
   said first storage device retrieving said plurality of data blocks from said non-volatile cache and returning said plurality of data blocks to said storage device client; and
   said storage device client transmitting a request to said second storage device to write said plurality of data blocks.

4. The method of claim 1, the steps further including:
   receiving a message indicating to cease retaining said plurality of data blocks; and
   in response to receiving said message, ceasing to retain said plurality of data blocks in said non-volatile cache.

5. The method of claim 4, wherein ceasing to retain includes discarding said plurality of data blocks from said non-volatile cache of said primary store of said first storage device.

6. The method of claim 1, the steps further including performing a write-though operation, wherein said write-through includes said writing said plurality of data blocks to said non-volatile cache of a primary store of said first storage device and writing said plurality of data blocks to said primary store.

7. The method of claim 1, wherein the step of resynchronizing includes:
   said storage device client of said mirrored set of storage devices transmitting a request for said plurality of data blocks to said first storage device;
   said first storage device retrieving said plurality of data blocks from said non-volatile cache and returning said plurality of data blocks to said storage device client; and
   said storage device client transmitting a request to said second storage device to write said plurality of data blocks.

8. One or more non-transitory storage media storing sequences of instructions which, when executed by one or more computing devices, cause:
   from a storage device client of a mirrored set of storage devices for mirroring data that includes a plurality of data blocks, a first storage device receiving one or more requests indicating to retain data blocks in a non-volatile cache of said first storage device;
   wherein said first storage device and a second storage device belong to said mirrored set of storage devices;
   in response to receiving one or more requests to write said plurality of data blocks stored in a primary store of said first storage device:
      said first storage device writing said plurality of data blocks to said non-volatile cache of said first storage device;
      in response to receiving said one or more requests indicating to retain data blocks, marking each data block of said plurality of data blocks for recovery retention;
   performing cache management on said non-volatile cache, wherein performing cache management includes, while each data block of said plurality of data blocks is clean, foregoing replacing said each data block in response to said each data block being marked for recovery retention; and after foregoing replacing said each data block of said plurality of data blocks, resynchronizing said second storage device using said plurality of data blocks retained in said non-volatile cache of said first storage device.

9. The one or more non-transitory storage media of claim 8, wherein the sequences of instructions include instructions that, when executed by said one or more computing devices, cause:

said storage device client of said mirrored set of storage devices transmitting said one or more requests to write said plurality of data blocks; and said storage device client of said mirrored set of storage devices tracking in a list of dirty data blocks said plurality of data blocks.

10. The one or more non-transitory storage media of claim 9, wherein resynchronizing includes:

based on the list of dirty data blocks, said storage device client identifying data blocks to resynchronize in said second storage device, wherein identifying data blocks to resynchronize includes identifying said plurality of data blocks;

said storage device client of said mirrored set of storage devices transmitting a request for said plurality of data blocks to said first storage device;

said first storage device retrieving said plurality of data blocks from said non-volatile cache and returning said plurality of data blocks to said storage device client; and said storage device client transmitting a request to said second storage device to write said plurality of data blocks.

11. The one or more non-transitory storage media of claim 8, wherein the sequences of instructions include instructions that, when executed by said one or more computing devices, cause:

receiving a message indicating to cease retaining said plurality of data blocks; and in response to receiving said message, ceasing to retain said plurality of data blocks in said non-volatile cache.

12. The one or more non-transitory storage media of claim 11, wherein ceasing to retain includes discarding said plurality of data blocks from said non-volatile cache of said primary store of said first storage device.

13. The one or more non-transitory storage media of claim 8, wherein the sequences of instructions include instructions that, when executed by said one or more computing devices, cause performing a write-though operation, wherein said write-through operation includes said writing said plurality of data blocks to said non-volatile cache of a primary store of said first storage device and writing said plurality of data blocks to said primary store.

14. The one or more non-transitory storage media of claim 8, wherein the sequences of instructions include instructions that, when executed by said one or more computing devices, cause:

said storage device client of said mirrored set of storage devices transmitting a request for said plurality of data blocks to said first storage device;

said first storage device retrieving said plurality of data blocks from said non-volatile cache and returning said plurality of data blocks to said storage device client; and said storage device client transmitting a request to said second storage device to write said plurality of data blocks.

* * * * *